July 1, 1958 C. A. SWEENEY 2,841,207
AUXILIARY SEAT FOR SEAT BOARDS
Filed Feb. 13, 1956
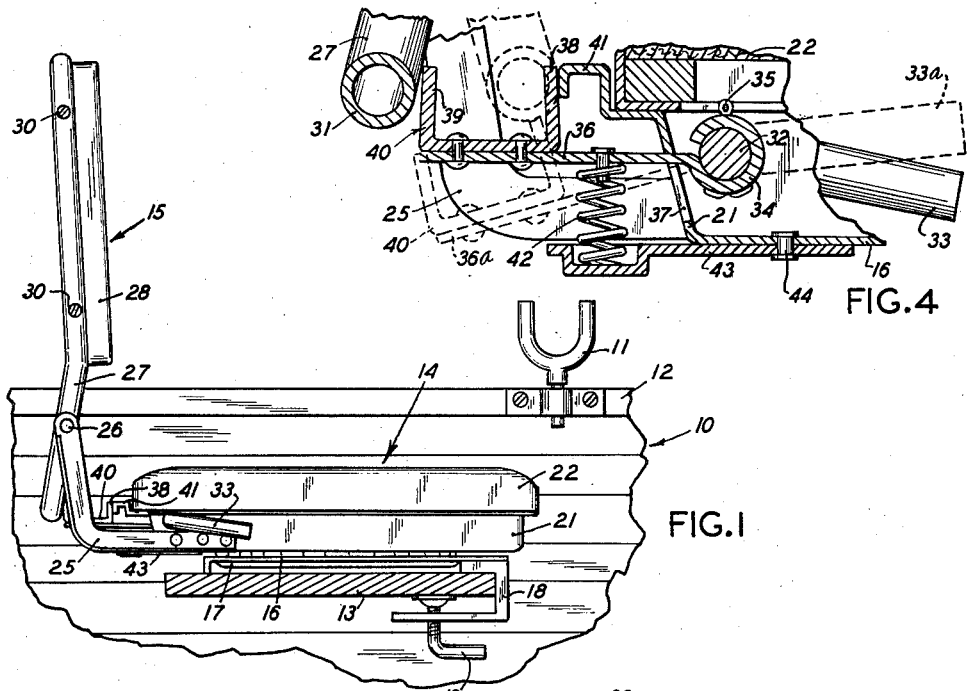
FIG.4
FIG.1
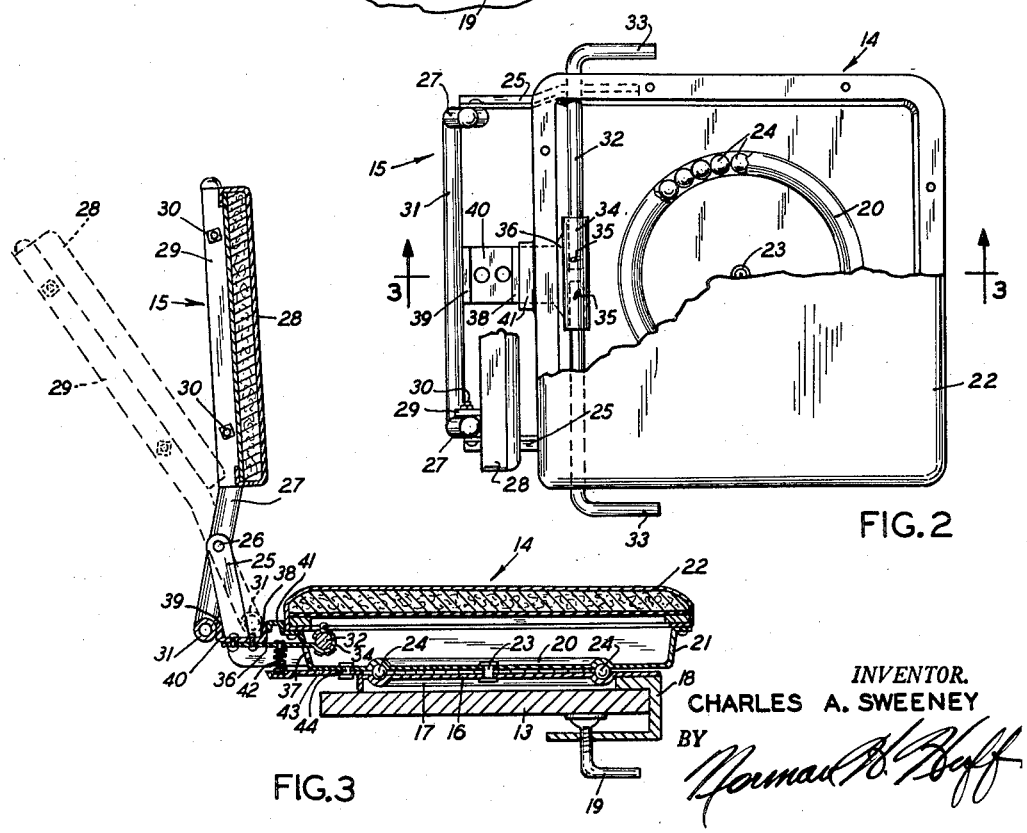
FIG.2
FIG.3
INVENTOR.
CHARLES A. SWEENEY
BY

2,841,207

AUXILIARY SEAT FOR SEAT BOARDS

Charles A. Sweeney, Spokane, Wash.

Application February 13, 1956, Serial No. 565,114

1 Claim. (Cl. 155—133)

This invention relates to certain new and useful improvements in auxiliary seats for use in conjunction with plank or boards seats of rowboats, bleachers of ball parks, and the like.

It has for one of its objects the provision of a portable seat and back rest which is simple, light of weight, and inexpensive, and which may be readily applied to a seat board to afford comfort to the user thereof.

Another object of the invention is to provide an auxiliary seat for seat boards which may be folded into a compact unit for ease in storage or carrying, and when unfolded may be easily applied to a seat board.

A further object is to provide an auxiliary seat for seat boards which comprises a support frame and a back rest frame pivotally united and foldable into a compact unit and, in addition, providing means for angularly positioning the back rest frame relative to the plane of the support frame to afford greater comfort to the one using the seat and also to permit changing of sitting positions as desired.

These and other objects of the invention will become apparent during the course of the following description wherein a preferred embodiment of the invention is disclosed and particularly pointed out in the appended claims.

In the drawings wherein like numerals are employed to designate like parts:

Figure 1 is a side elevation of my improved auxiliary seat secured to a seat board, shown in section, of a rowboat shown in fragmentary elevation;

Figure 2 is a top plan view of my auxiliary seat and having portions broken away for convenience of illustration;

Figure 3 is a vertical cross section taken through the auxiilary seat and a seat board and showing the back rest frame in two of the three possible angular positions by the full and broken lines on the plane indicated by section line 3—3 of Figure 2; and Figure 4 is an enlarged fragmentary vertical cross section taken through the rear edge portion of the seat frame and disclosing the back rest adjusting mechanism.

Referring now more particularly to the drawing, the numeral 10 indicates a rowboat having a conventional oarlock 11 pivotally supported on a vertical axis in the gunwale 12 and having a plank type seat board 13 extending laterally of the rowboat. The numerals 14 and 15 indicate the seat frame and the back rest frame respectively.

As seen most clearly in Figures 1 and 3, the seat frame 14 is carried by a support frame 16 which in actual practice is stamped from a sheet of metal and is formed with an annular raceway 17. A clamp 18 is welded or otherwise secured thereto in a position to fit over the front or back edge of the seat board 13. The support frame is thus secured to the seat board by manually operated hand bolt 19. The seat frame 14 is also preferably formed from sheet metal by a stamping process and is provided with a coincident bearing raceway 20 and upstanding walls 21 to which seat cushion 22 may be secured by any convenient means.

A pivot pin 23 extends through the seat frame 14 and the support frame 16 centrically of the coincident raceways and pivotally unites the two members for swivel movement. An annular thrust bearing 24 preferably having ball bearings contained in a retainer but not necessarily limited thereto is disposed in the cooperating raceways and therefore supports the seat frame 14 for swivel movement upon the support frame 16 which is adapted to be clamped to the seat board 13.

Rearwardly extending angular arms 25 are secured to the lateral side walls of the seat frame 14 and extend rearwardly and upwardly to support the back rest frame 15. Journal pins 26 extend through the free ends of the arms 25 and through the parallel side bars 27 of the back rest frame 15. The back rest frame 15 is substantially rectangular in plane shape and therefore constitutes substantially a parallelogram. The back rest cushion 28 is provided with rearwardly extending ears 29 which are secured as by bolts 30 to the side bars 27 of the back rest frame 15. At their lower ends, the side bars 27 are provided with a laterally extending support bar 31 which extends axially parallel to the axis of the journal pins 26. The journal pins obviously are spaced from the support bar 31 as may be seen clearly in the drawing.

A rock shaft 32 is journaled in the side walls 21 adjacent to the rear edge of the seat frame 14. At its ends, the rock shaft 32 is provided with manually operable levers or handles 33 for manually rocking the rock shaft 32. Midway its length, the rock shaft 32 is separated for ease of assembly and yet is physically united by means of a sleeve 34 which is pinned or otherwise secured at 35 to each of the inner ends of the rock shaft 32, as may be clearly seen in Figure 2. The sleeve is provided with a rearwardly disposed radially extending bar 36 which extends outwardly of the seat frame 14 through an aperture 37 formed through the rear wall 21. The aperture is of sufficient size to permit movement of the radially extending bar 36 from the full line position of Figure 4 to the broken line position thereof.

Outwardly of the seat frame 14, the radially extending bar 36 is provided with a channel shaped member 40 which has upwardly disposed inner and outer flanges 38 and 39. As will be plainly seen in Figure 4 and also in other figures of the drawing, the seat frame 14 is provided with a rearwardly extending lip or flange 41, and the inner flange 38 of the channel member 40 impinges against this member 41 and is supported thereagainst. Obviously because of the pivot axis 26, the support bar 31 is movable in an arcuate path as the back rest frame is tilted and the flanges 38 and 39 are initially disposed in this arcuate path so that the support arm 31 will strike the flanges 38 or 39 when the radially extending bar 36 is in its initial normal position shown in full line in Figure 4.

The back rest cushion 28 is in a plane disposed at substantially right angle to the plane of the seat cushion 22 when the support bar 31 is supported against the flange or stop 39. By raising the lever 33 to the broken line position 33a (Figure 4) the radially extending bar 36 and therefore the channel member 40 are removed to the broken line position 36a (Figure 4) and the seat frame 15 may be shifted about its pivotal axis, defined by the journal pins 26, so that the support bar 31 may be disposed either against the flange or stop 38 as seen in the broken line position of Figure 3 or against the flange 41 as seen by the broken line position of Figure 4, thus providing a seat having a selectively adjustable back rest frame.

The radially extending bar 36 is yieldably supported by means of a compression spring 42 which is supported upon an extension 43 riveted or otherwise secured at 44 to the seat frame 14 and urges radially extending arm 36 upwardly.

Having thus described my invention, I claim:

An auxiliary seat for seat boards comprising a seat frame provided with means for securing said frame to said seat boards for swivel movement of said seat frame; a back rest frame defining substantially a parallelogram pivotally secured to said seat frame on an axis parallel to the plane of said seat frame and at a point spaced from a marginal edge portion of said back rest frame, for selective angular positioning relative to said frame and resulting in an enlarged back support portion disposed above said pivot axis and an opposed laterally extending support bar disposed below said pivot axis; a rock shaft journaled in said seat frame parallel to the pivotal axis of said back rest frame; a radially extending bar carried by said rock shaft and extending from said seat frame toward said support bar; a channel member secured to said radially extending bar and having upwardly extending inner and outer flanges disposed in the arc of movement of said support bar when the radially extending bar is in its raised position, the inner flange of said channel member being disposed in contact with said seat frame when in the raised position whereby to support said channel member and support bar; depressible means urging said radially extending bar to said raised position; and manually operable levers on said rock shaft for selectively depressing said radially extending bar and removing said flanges from the arc of said support bar.

References Cited in the file of this patent

UNITED STATES PATENTS

| | | |
|---|---|---|
| 571,247 | Rueter | Nov. 10, 1896 |
| 659,811 | Chichester | Oct. 16, 1900 |
| 1,617,805 | Hansen | Feb. 15, 1927 |
| 2,198,157 | Fisher | Apr. 23, 1940 |

FOREIGN PATENTS

| | | |
|---|---|---|
| 461,756 | Italy | Feb. 14, 1951 |